US009167458B2

(12) United States Patent
Zhou et al.

(10) Patent No.: US 9,167,458 B2
(45) Date of Patent: Oct. 20, 2015

(54) USING DOWNLINK TFCI TO GENERATE A LARGER IDLE INTERVAL

(75) Inventors: Heng Zhou, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 13/612,475

(22) Filed: Sep. 12, 2012

(65) Prior Publication Data

US 2014/0071842 A1 Mar. 13, 2014

(51) Int. Cl.
| | |
|---|---|
| H04W 24/08 | (2009.01) |
| H04W 72/04 | (2009.01) |
| H04W 48/08 | (2009.01) |
| H04W 76/06 | (2009.01) |
| H04W 74/04 | (2009.01) |
| H04W 84/06 | (2009.01) |
| H04W 24/10 | (2009.01) |

(52) U.S. Cl.
CPC ............ *H04W 24/08* (2013.01); *H04W 24/10* (2013.01); *H04W 48/08* (2013.01); *H04W 72/0446* (2013.01); *H04W 74/04* (2013.01); *H04W 76/06* (2013.01); *H04W 84/06* (2013.01)

(58) Field of Classification Search
CPC ............ H04W 72/1289; H04W 52/44; H04W 72/1252; H04W 72/1273; H04W 24/10; H04W 48/08; H04W 36/94; H04W 36/14; H04W 28/65; H04B 7/2606
USPC ......... 370/230–240, 252, 468, 506, 508, 509, 370/510, 540
See application file for complete search history.

(56) References Cited

U.S. PATENT DOCUMENTS

| 5,594,738 | A | * | 1/1997 | Crisler et al. ................. 370/347 |
| 6,078,577 | A | * | 6/2000 | Bishop et al. ................. 370/348 |
| 7,200,124 | B2 | | 4/2007 | Kim et al. |
| 7,315,733 | B2 | | 1/2008 | Ohsuge |
| 2002/0082020 | A1 | * | 6/2002 | Lee et al. ...................... 455/450 |
| 2010/0296410 | A1 | * | 11/2010 | Kazmi et al. ................. 370/252 |
| 2012/0083221 | A1 | | 4/2012 | Ranta-Aho et al. |
| 2012/0113826 | A1 | | 5/2012 | Zhou et al. |
| 2013/0142223 | A1 | * | 6/2013 | Kuo ............................. 375/219 |

FOREIGN PATENT DOCUMENTS

| CN | 1599296 A | 3/2005 |
| CN | 102076008 A | 5/2011 |
| WO | 2005064972 A1 | 7/2005 |
| WO | 2005120121 A1 | 12/2005 |
| WO | 2009096846 A1 | 8/2009 |
| WO | 2011102769 A1 | 8/2011 |

OTHER PUBLICATIONS

International Search Report and Written Opinion—PCT/US2013/059542—ISA/EPO—Feb. 19, 2014.

* cited by examiner

*Primary Examiner* — Jay Lee
*Assistant Examiner* — Jean F Voltaire
(74) *Attorney, Agent, or Firm* — Kristine U. Ekwueme

(57) ABSTRACT

A method of wireless communication is presented. The method includes receiving a transport format combination indicator (TFCI) indicating a number of blocks and a block size for data to be sent on downlink time slots of a current frame and/or a subsequent frame. The method also includes determining when data is not expected to be received on an allocated downlink time slot and performing neighbor cell measurement during the allocated downlink time slot.

16 Claims, 7 Drawing Sheets

USING DOWNLINK TFCI TO GENERATE A LARGER IDLE INTERVAL

BACKGROUND

1. Field

Aspects of the present disclosure relate generally to wireless communication systems, and more particularly, to using a downlink transport format combination indication (TFCI) to generate a new or larder idle time interval in a TD-SCDMA network.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Packet Access (HSPA), which provides higher data transfer speeds and capacity to associated UMTS networks. HSPA is a collection of two mobile telephony protocols, High Speed Downlink Packet Access (HSDPA) and High Speed Uplink Packet Access (HSUPA), that extends and improves the performance of existing wideband protocols.

As the demand for mobile broadband access continues to increase, research and development continue to advance the UMTS technologies not only to meet the growing demand for mobile broadband access, but to advance and enhance the user experience with mobile communications.

SUMMARY

According to an aspect of the present disclosure a method of wireless communication is presented. The method includes determining when data is not expected to be received on an allocated downlink time slot. The method also includes performing neighbor cell measurement during the allocated downlink time slot.

According to another aspect, an apparatus for wireless communications is presented. The apparatus includes means for determining when data is not expected to be received on an allocated downlink time slot. The apparatus also includes means for performing neighbor cell measurement during the allocated downlink time slot.

According to yet another aspect, a computer program product for wireless communications is presented. The computer program product includes a non-transitory computer-readable medium having program code recorded thereon. The program code includes program code to determine when data is not expected to be received on an allocated downlink time slot. The program code also includes program code to perform neighbor cell measurement during the allocated downlink time slot.

According to still yet another aspect, an apparatus for wireless communications is presented. The apparatus includes a memory and a processor(s) coupled to the memory. The processor(s) is configured being configured to determine when data is not expected to be received on an allocated downlink time slot. The processor(s) is also configured to perform neighbor cell measurement during the allocated downlink time slot.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
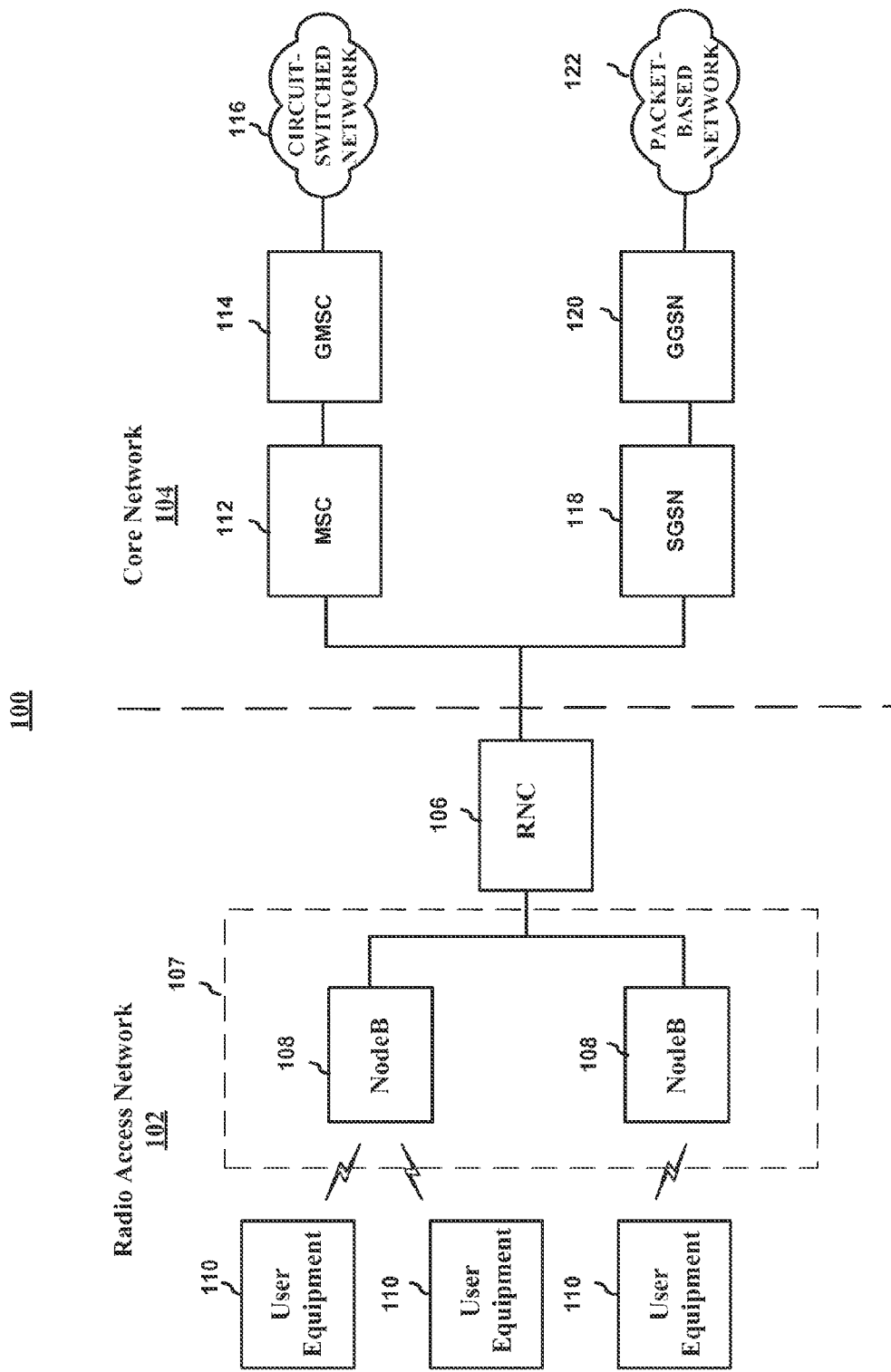
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two node Bs 108 are shown; however, the RNS 107 may include any number of wireless node Bs. The node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the node Bs 108. The downlink (DL), also called the forward link, refers to the communication link from a node B to a UE, and the uplink (UL), also called the reverse link, refers to the communication link from a UE to a node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a node B 108 and a UE 110, but divides uplink and downlink transmissions into different time slots in the carrier.

Figure 2:
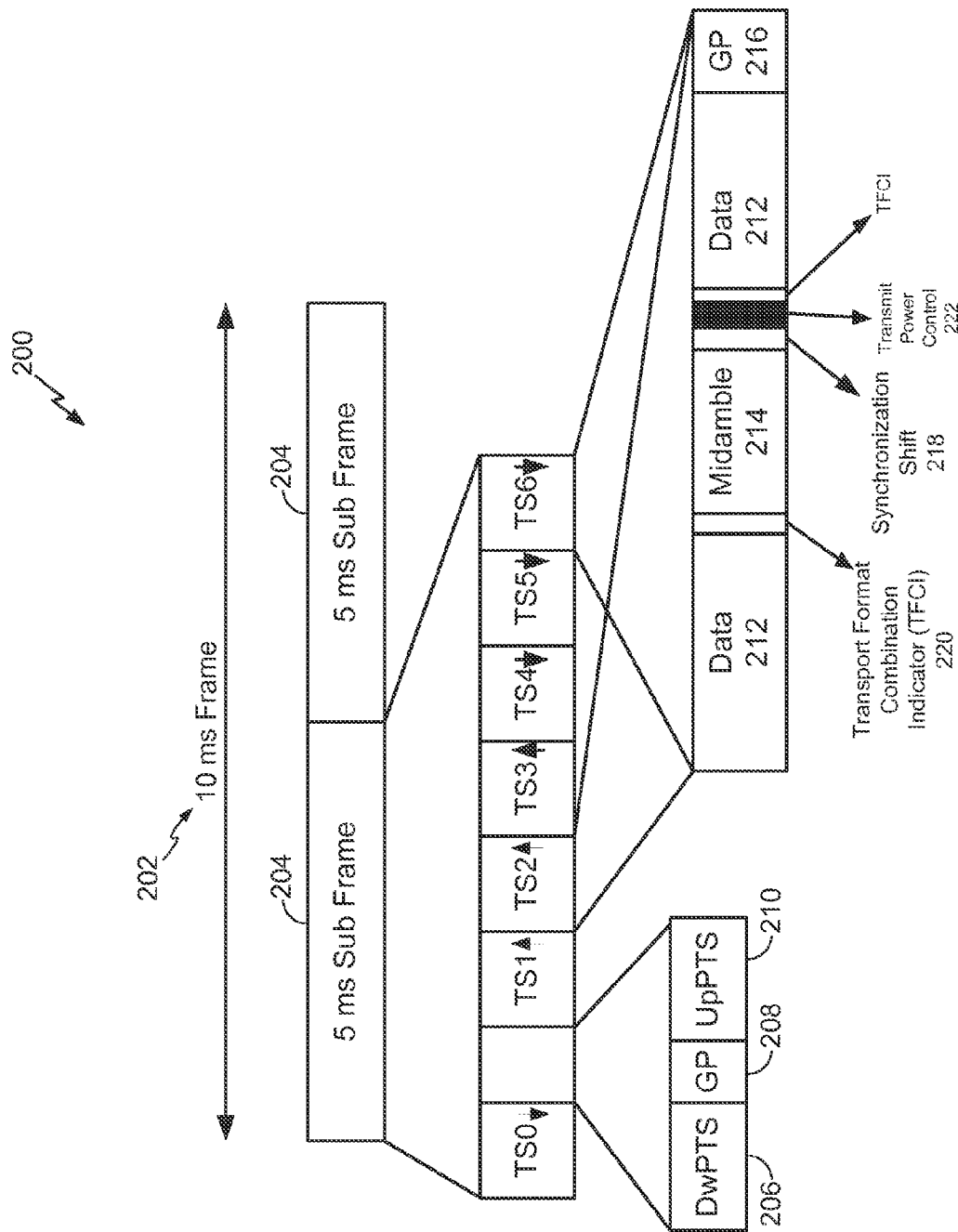
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The chip rate in TD-SCDMA is 1.28 Mcps. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 (each with a length of 352 chips) separated by a midamble 214 (with a length of 144 chips) and followed by a guard period (GP) 216 (with a length of 16 chips). The midamble 214 may be used for features, such as channel estimation, while the guard period 216 may be used to avoid inter-burst interference. Also transmitted in the data portion is some Layer 1 control information, including Synchronization Shift (SS) bits 218. Synchronization Shift bits 218 only appear in the second part of the data portion. The Synchronization Shift bits 218 immediately following the midamble can indicate three cases: decrease shift, increase shift, or do nothing in the upload transmit timing. The positions of the SS bits 218 are not generally used during uplink communications.

Figure 3:
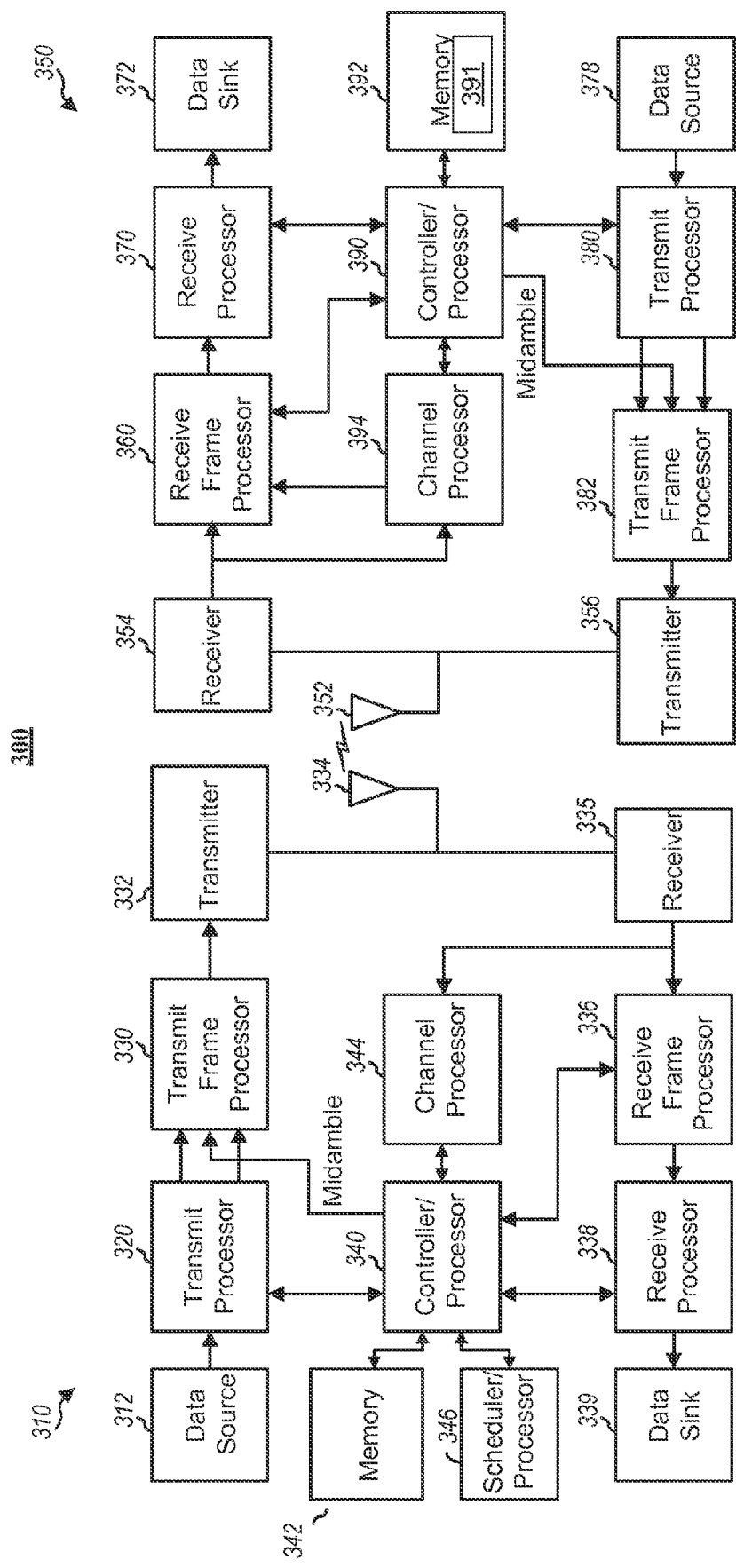
FIG. 3 is a block diagram conceptually illustrating an example of a node B in communication with a UE in a telecommunications system.

FIG. 3 is a block diagram of a node B 310 in communication with a UE 350 in a RAN 300, where the RAN 300 may be the RAN 102 in FIG. 1, the node B 310 may be the node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the node B 310. More specifically, the receive processor 370 descrambles and despreads the symbols, and then determines the most likely signal constellation points transmitted by the node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the node B 310 or from feedback contained in the midamble transmitted by the node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the node B 310 and the UE 350, respectively. For example, the memory 392 of the UE 350 may store TFCI decoding module 391 which, when executed by the controller/processor 390, configures the UE 350 for using the TFCI to determine unused downlink time slots for performing inter-RAT and inter-frequency measurements. A scheduler/processor 346 at the node B 310 may be used to allocate resources to the UEs and schedule downlink and/or uplink transmissions for the UEs. short invention title Using Downlink TFCI to Generate a Larger Idle Interval FIG. 2 illustrates an example of a TD-SCDMA frame. As illustrated in FIG. 2, the TD-SCDMA frame is divided into two sub-frames 204, such as two 5 ms sub-frames, each subframe having 7 time slots (TSs). The subframe 204 starts with a downlink (DL) time slot (TS0), followed by a downlink pilot slot (DwPTS) 206, a guard period (GP) 208, an uplink pilot slot (UpPTS) 210, one or more uplink (UL) time slots, and one or more DL time slots.

Each time slot includes data slots 212 that are divided by a midamble 214. Furthermore, the data slots may include control information, such as a transport format combination indicator (TFCI) 220, a synchronization shift (SS) 218, and a transmit power control (TPC) 222. As an example, the TD-SCDMA frame of FIG. 2 uses three UL timeslots (TS1-TS3) and four DL time slots (TS0 and TS4-TS6), still it should be noted that the TD-SCDMA frame is not limited to the number of slots shown in FIG. 2.

The TD-SCDMA frame is transmitted on a transport channel (TrCH). A coded composite transport channel (CCTrCH) includes one or more transport channels. A transmission time interval (TTI) for each transport channel may be, for example, 10 ms, 20 ms, 40 ms, or 80 ms. The size of the TD-SCDMA subframe is based on the transmission time interval. The TFCI indicates the transport channel format for a particular transport channel of a coded composite transport channel.

Based on the TD-SCDMA standards, the TFCI is always transmitted in the first allocated physical downlink channel and is located in a special bit of the physical downlink channel. The subsequent physical downlink channels may also include the TFCI, however, the TFCI of the subsequent physical downlink channels is a redundant TFCI and may be ignored by the UE. The TFCI included in the physical downlink channel of both sub-frames is used to decode the TFCI. That is, the UE decodes the TFCI after receiving both sub frames of the TD-SCDMA frame.

The TFCI indicates the data rate used by the base station. The data rate may define the data format, and the data format may define the data size. Therefore, based on the data rate, a UE may determine the number of physical downlink channels that may be used for transmitting data. That is, the TFCI indicates the transport channel format and the transport channel format indicates the number of blocks used and the block size (e.g., the transport format). Thus, based on the transport channel format, the UE may determine the number of downlink time slots that will be used for data transmission.

As an example, a transport format of zero (TF0) may indicate that zero blocks are used and a block size is 500 bits. Because zero blocks are used, the UE may determine that none of the physical downlink channels will be used for transmitting data. As another example, a transport format of one (TF1) may indicate that one block will be used and a block size is 500 bits. The UE may determine the number of physical downlink channels that will be used for transmitting data based on the block size and the number of blocks used.

In a TD-SCDMA system, a UE may use an idle interval to perform inter-frequency or inter-RAT measurements. The idle interval refers to a period which is not allocated to UE for either downlink or uplink. TD-SCDMA does not specify a compressed mode for performing inter-frequency or inter-RAT measurements in a connected (CELL_DCH) state. Therefore, the inter-frequency or inter-RAT measurements are performed during the idle interval.

Figure 4:
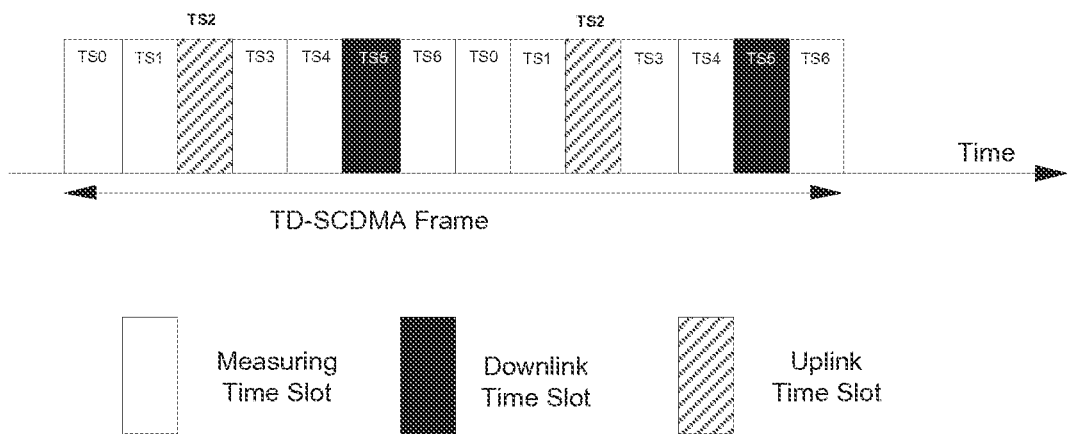
FIG. 4 is a block diagram of time slots in a conventional TD-SCDMA frame.

FIG. 4 illustrates an example of time slots in a TD-SCDMA frame. As illustrated in FIG. 4, as an example, two of the time slots (TS5) of the TD-SCDMA frame may be specified for downlink reception and two of the time slots (TS2) may be specified for uplink transmissions. The remaining time slots (TS0, TS1, TS3, TS4, and TS6) may be idle intervals and may be used for inter-frequency or inter-RAT measurements.

In some cases, when high speed packet access (HSPA) is specified for the TD-SCDMA network, most, or all, of the time slots may be used for a dedicated physical channel (DPCH), a high speed downlink packet access (HSDPA) channel, or a high speed uplink packet access (HSUPA) channel. That is, the number of idle slots available for inter-frequency and inter-RAT measurements may be decreased. The decreased number of available idle time slots may delay the measurement reports. The present disclosure proposes aspects for specifying larger idle intervals based on the TFCI.

In some cases, the base station may allocate physical channel resources to a UE. Still, the base station may not use all of the allocated physical channel resources for each transmission. That is, some allocated downlink channel resources, such as downlink time slots, may not be used for data transmission. For example, the downlink data rate may be increased when a channel condition is good. Accordingly, the base station may allocate an improved TFCI to transmit the data bits in fewer time slots than those that are allocated so that not all downlink slots are used. Thus, an idle interval may be specified for the unused downlink slots so that the UE may perform inter-frequency and inter-RAT measurements.

According to aspects of the present disclosure, based on the TFCI, the UE may determine the time slots in the current frame and/or the subsequent frame that may be used for downlink transmissions. That is, according to one aspect, the UE may determine the transport channel format for a current TD-SCDMA frame and may then determine the unused downlink time slots for the current TD-SCDMA frame and/or a subsequent TD-SCDMA frame based on the transport channel format for the current TD-SCDMA frame. According to another aspect, the UE may determine the maximum data rate for a subsequent TD-SCDMA frame based on the TFCI of a current TD-SCDMA frame. The UE may determine the unused downlink time slots for the subsequent TD-SCDMA frame based on the determined maximum data rate of the current TD-SCDMA frame.

Figure 5:
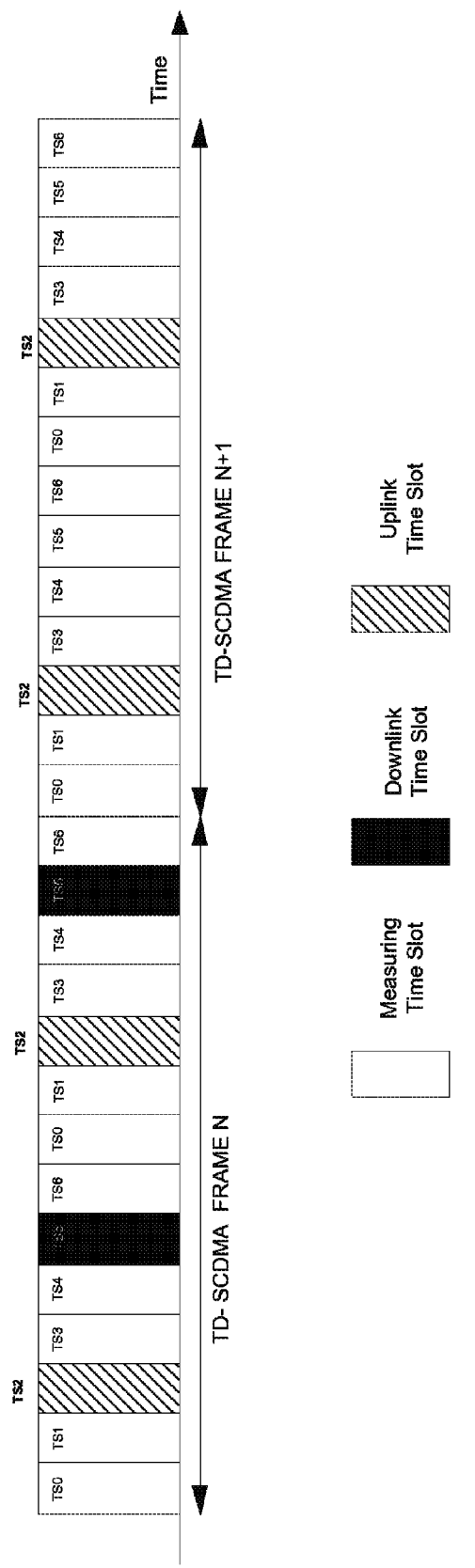
FIG. 5 is a block diagram of time slots in a TD-SCDMA frame according to an aspect of the present disclosure.

FIG. 5 illustrates an example of using the decoded TFCI to determine the downlink time slots that may be used as idle slots. As illustrated in FIG. 5, the UE may receive a transmission from a base station at downlink time slots (TS5) in the N TD-SCDMA frame. As previously discussed, the first allocated downlink time slot includes the TFCI and subsequent downlink timeslots may also include the TFCI, however, the TFCI is redundant and may be ignored by the UE. In this example, the TS5 downlink time slots may be the first allocated downlink time slot, and therefore, the UE may receive the TFCI at each TS5 downlink time slot.

As previously discussed, the UE may decode the TFCI after receiving both downlink transmissions of a specific time slot. That is, as illustrated in FIG. 5, the UE may receive a portion of the TFCI in the first TS5 time slot of the N TD-SCDMA frame and receive another portion of the TFCI in the second TS5 time slot of the N TD-SCDMA frame. The UE may then decode the TFCI after receiving the TFCI in the first and second TS5 time slots. The TFCI indicates the transport channel format used by the base station. The transport channel format indicates the number of blocks used for downlink data transmissions and the block size.

As an example, in FIG. 5, the decoded TFCI may indicate that the base station is using a transport channel format of zero, and therefore, the base station is not transmitting data on the allocated downlink time slots. Accordingly, the UE determines that the subsequent downlink subframes (TS0, TS1, and TS3-TS6) may be used as idle slots to perform inter-RAT and inter-frequency measurements. In some aspects, the idle time slots may be the unused downlink time slots of the current TD-SCDMA frame (frame N) and the unused downlink time slots of the subsequent TD-SCDMA frame (frame N+1). Alternatively, in another aspect, the idle time slots may only be the unused downlink time slots of the subsequent TD-SCDMA frame (frame N+1).

Figure 6:
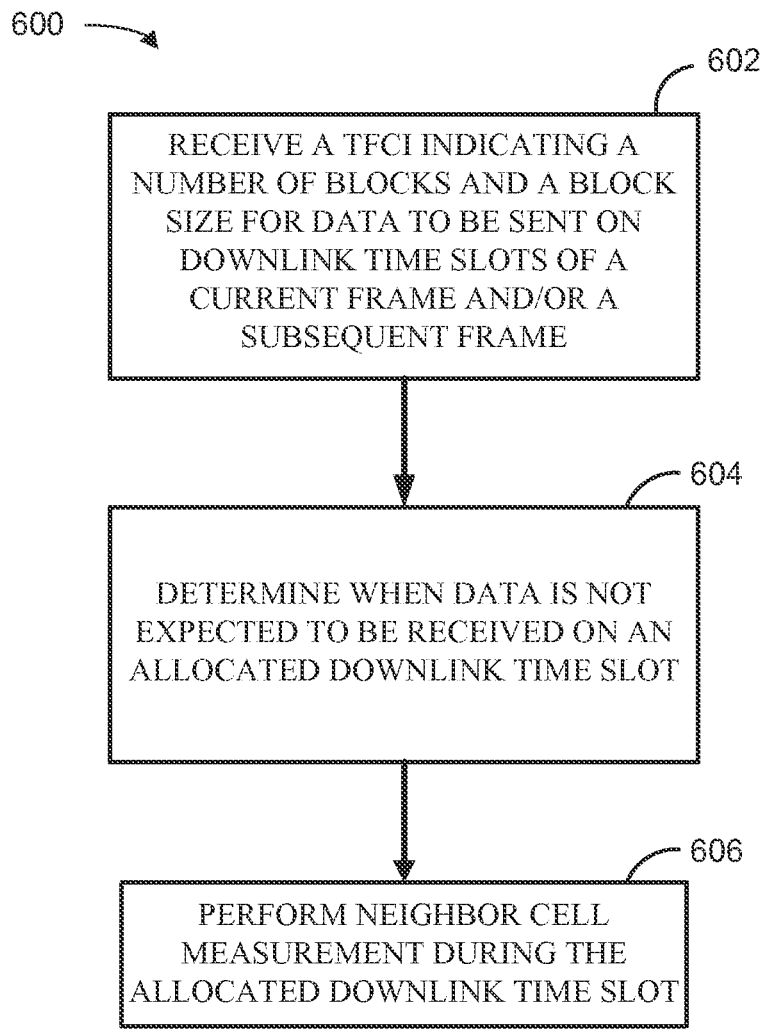
FIG. 6 is a block diagram illustrating a method for using downlink TFCI to generate a larger idle interval according to one aspect of the present disclosure.

FIG. 6 shows a wireless communication method 600 according to one aspect of the disclosure. A UE may receive a TFCI indicating a number of blocks and a block size for data to be sent on downlink time slots of a current frame and/or a subsequent frame, as shown in block 602. The UE may determine when data is not expected to be received on an allocated downlink time slot, as shown in block 604. The UE may also perform neighbor cell measurement during the allocated downlink time slot, as shown in block 606.

Figure 7:
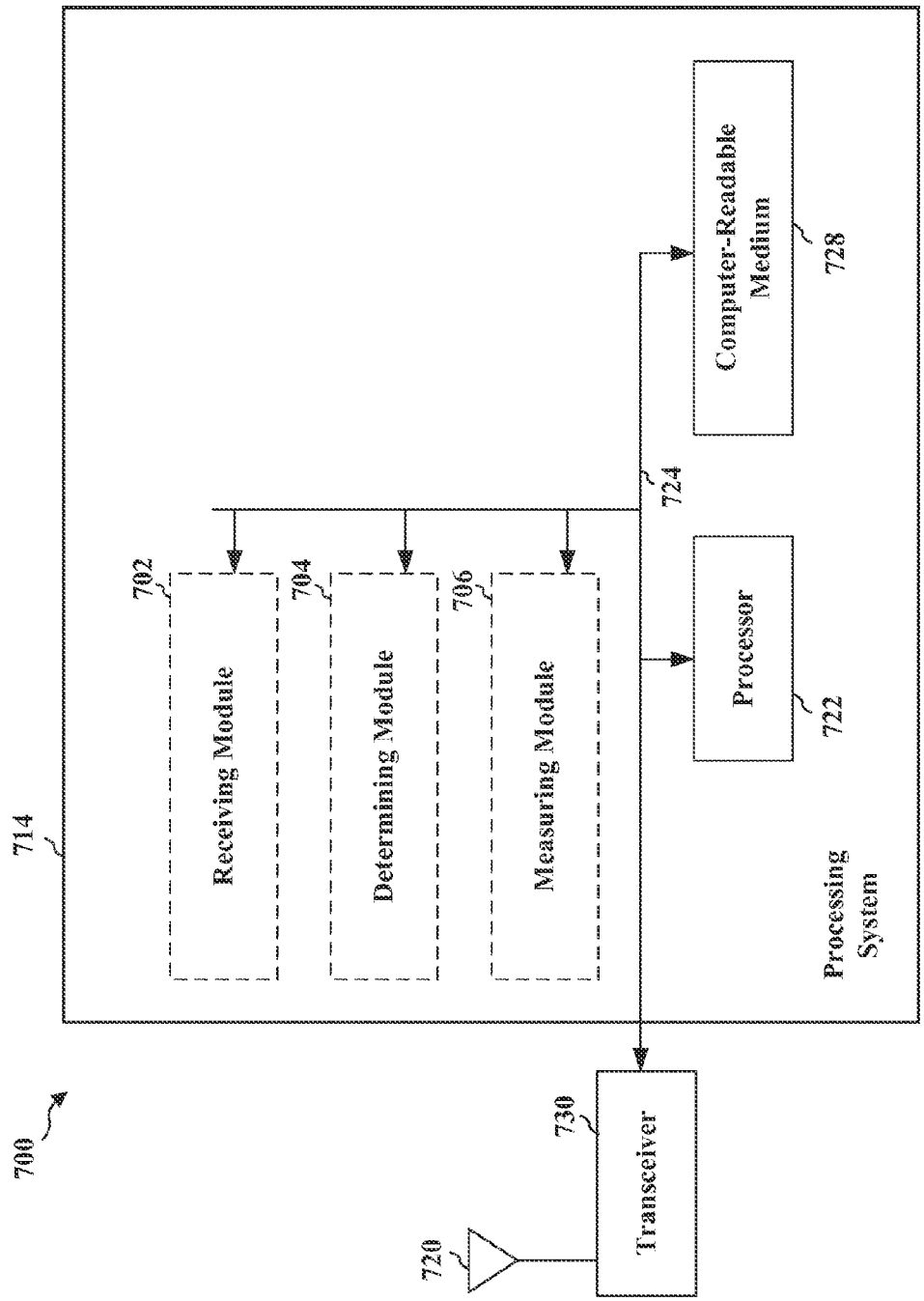
FIG. 7 is a diagram illustrating an example of a hardware implementation for an apparatus employing a processing system according to one aspect of the present disclosure.

FIG. 7 is a diagram illustrating an example of a hardware implementation for an apparatus 700 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 722 the modules 702, 704, 706 and the computer-readable medium 728. The bus 724 may also link various other circuits such as timing sources, peripherals, voltage regulators, and power management circuits, which are well known in the art, and therefore, will not be described any further.

The apparatus includes a processing system 714 coupled to a transceiver 730. The transceiver 730 is coupled to one or more antennas 720. The transceiver 730 enables communicating with various other apparatus over a transmission medium. The processing system 714 includes a processor 722 coupled to a computer-readable medium 728. The processor 722 is responsible for general processing, including the execution of software stored on the computer-readable medium 728. The software, when executed by the processor 722, causes the processing system 714 to perform the various functions described for any particular apparatus. The computer-readable medium 728 may also be used for storing data that is manipulated by the processor 722 when executing software.

The processing system 714 includes a receiving module 702 for receiving a TFCI indicating a number of blocks and a block size for data to be sent on downlink time slots of a current frame and/or a subsequent frame. The processing system 714 also includes a determining module 704 for determining when data is not expected to be received on an allocated downlink time slot. The processing system 714 may also include a measuring module 706 for performing neighbor cell measurement during the allocated downlink time slot. The modules may be software modules running in the processor 722, resident/stored in the computer-readable medium 728, one or more hardware modules coupled to the processor 722, or some combination thereof. The processing system 714 may be a component of the UE 350 and may include the memory 392, and/or the controller/processor 390.

In one configuration, an apparatus such as a UE is configured for wireless communication including means for receiving, means for determining, and means for measuring. In one aspect, the above means may be the antennas 352, the receiver 354, the channel processor 394, the receive frame processor 360, the receive processor 370, the transmitter 356, the transmit frame processor 382, the transmit processor 380, the controller/processor 390, the memory 392, TFCI decoding module 391, receiving module 702, determining module 704, measuring module 706 and/or the processing system 714 configured to perform the functions recited by the aforementioned means. In another aspect, the aforementioned means may be a module or any apparatus configured to perform the functions recited by the aforementioned means.

Several aspects of a telecommunications system has been presented with reference to TD-SCDMA systems. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   allocating downlink time slots of at least one of a current frame or a subsequent frame comprising idle intervals for neighbor cell measurement;
   determining when data is not expected to be received on a downlink time slot allocated for the reception of data, in which the determining comprises receiving a transport format combination indicator (TFCI) indicating a number of blocks and a block size for data to be sent on downlink time slots of the at least one of the current frame or the subsequent frame; and
   performing the neighbor cell measurement during the idle intervals and during the downlink time slot allocated for the reception of data.

2. The method of claim 1, in which the number of blocks is zero.

3. The method of claim 1, in which the downlink time slot allocated for the reception of data is in a current frame or a subsequent frame.

4. The method of claim 1, further comprising:
   determining a maximum data rate for a subsequent frame based at least in part on the transport format combination indicator (TFCI) of the current frame; and
   allocating the downlink time slots for the neighbor cell measurement based on the maximum data rate.

5. An apparatus for wireless communications, comprising:
   means for allocating downlink time slots of at least one of a current frame or a subsequent frame comprising idle intervals for neighbor cell measurement;
   means for determining when data is not expected to be received on a downlink time slot allocated for the reception of data, in which the determining comprises receiving a transport format combination indicator (TFCI) indicating a number of blocks and a block size for data to be sent on downlink time slots of the at least one of the current frame or the subsequent frame; and
   means for performing the neighbor cell measurement during the idle intervals and during the downlink time slot allocated for the reception of data.

6. The apparatus of claim 5, in which the number of blocks is zero.

7. The apparatus of claim 5, in which the downlink time slot allocated for the reception of data is in a current frame or a subsequent frame.

8. The apparatus of claim 5, further comprising:
   means for determining a maximum data rate for a subsequent frame based at least in part on the transport format combination indicator (TFCI) of the current frame; and
   means for allocating the downlink time slots for the neighbor cell measurement based on the maximum data rate.

9. A computer program product for wireless communications, the computer program product comprising:
   a non-transitory computer-readable medium having program code recorded thereon, the program code comprising:
      program code to allocate downlink time slots of at least one of a current frame or a subsequent frame comprising idle intervals for neighbor cell measurement;
      program code to determine when data is not expected to be received on a downlink time slot allocated for the reception of data, in which the determining comprises receiving a transport format combination indicator (TFCI) indicating a number of blocks and a block size for data to be sent on downlink time slots of the at least one of the current frame or the subsequent frame; and
      program code to perform the neighbor cell measurement during the idle intervals and during the downlink time slot allocated for the reception of data.

10. The computer program product of claim 9, in which the number of blocks is zero.

11. The computer program product of claim 9, in which the downlink time slot allocated for the reception of data is in a current frame or a subsequent frame.

12. The computer program product of claim 9, further comprising:
    program code to determine a maximum data rate for a subsequent frame based at least in part on the transport format combination indicator (TFCI) of the current frame; and
    program code to allocate the downlink time slots for the neighbor cell measurement based on the maximum data rate.

13. An apparatus for wireless communications, comprising:
    a memory; and
    at least one processor coupled to the memory, the at least one processor being configured:
       to allocate downlink time slots of at least one of a current frame or a subsequent frame comprising idle intervals for neighbor cell measurement;
       to determine when data is not expected to be received on a downlink time slot allocated for the reception of data, in which the determining comprises receiving a transport format combination indicator (TFCI) indicating a number of blocks and a block size for data to be sent on downlink time slots of the at least one of the current frame or the subsequent frame; and to perform the neighbor cell measurement during the idle intervals and during the downlink time slot allocated for the reception of data.

14. The apparatus of claim 13, in which the number of blocks is zero.

15. The apparatus of claim 13, in which the downlink time slot allocated for the reception of data in a current frame or a subsequent frame.

16. The apparatus of claim 13, in which the at least one processor is further configured:

to determine a maximum data rate for a subsequent frame based at least in part on the transport format combination indicator (TFCI) of the current frame; and to allocate the downlink time slots for the neighbor cell measurement based on the maximum data rate.

* * * * *